Figure 1:
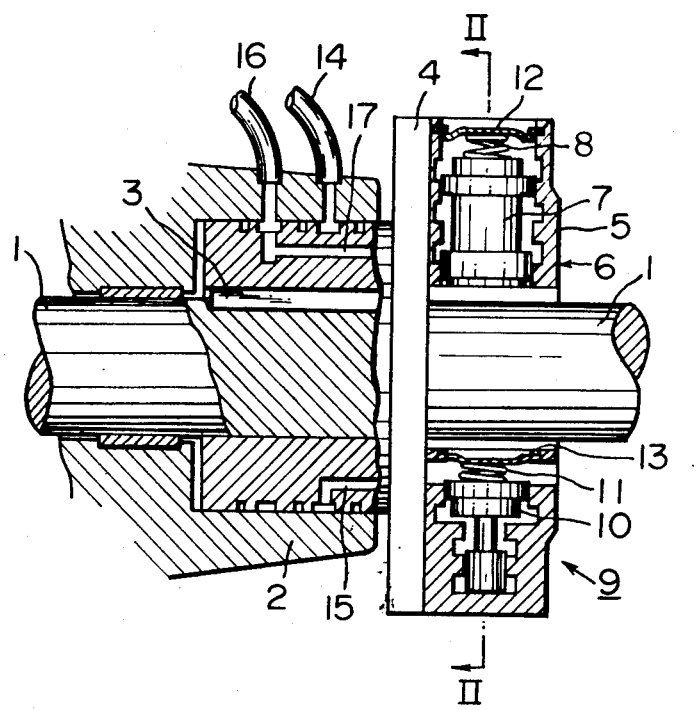

United States Patent
Ichimura

[15] 3,690,335
[45] Sept. 12, 1972

[54] HYDRAULIC GOVERNOR VALVE ASSEMBLY

[72] Inventor: Hirohisa Ichimura, Yokohama, Japan

[73] Assignee: Nissan Jidosha Kabushiki Kaisha, Yokohama, Japan

[22] Filed: Dec. 28, 1970

[21] Appl. No.: 102,151

Related U.S. Application Data

[63] Continuation of Ser. No. 781,803, Dec. 1968, abandoned.

[52] U.S. Cl. ............................................. 137/54
[51] Int. Cl. .......................................... G05d 13/36
[58] Field of Search ........................... 137/54, 56

[56] References Cited

UNITED STATES PATENTS

| | | |
|---|---|---|
| 2,711,749 | 6/1955 | Hettinger..................137/56 |
| 3,048,184 | 8/1962 | Duffy.........................137/54 |
| 3,279,486 | 10/1966 | Duffy.........................137/54 |
| 3,322,133 | 5/1967 | Searles......................137/56 |
| 3,431,928 | 3/1969 | Pierce........................137/54 |
| 3,566,894 | 3/1971 | Satoh.........................137/54 |
| 3,568,696 | 3/1971 | Kubo..........................137/54 |

*Primary Examiner*—Robert G. Nilson
*Attorney*—Sughrue, Rothwell, Mion, Zinn & Macpeak

[57] ABSTRACT

A hydraulic governor valve assembly for hydraulic control system of automatic transmission for vehicles provides low governor pressure at low vehicle speed range, stepwise or steeply increasing pressure at predetermined speed range and then rather gradually increasing governor pressure over the speed range to output circuit, and utilizes the governed pressure as pilot pressure while the low speed range.

4 Claims, 4 Drawing Figures

HYDRAULIC GOVERNOR VALVE ASSEMBLY

This application is in continuation of application Ser. No. 781,803, filed Dec. 6, 1968, and now abandoned.

The present invention relates to a hydraulic governor device for hydraulic control system of automatic transmission for vehicles.

In a known three speeds full automatic transmission system for a passenger car, as one example, actuating range of hydraulic shift control system may be 10 to 40 km/h to shift from first speed to second speed and 30 to 90 km/h to shift from second speed to third speed, in relation to the vehicle speed and the engine throttle valve opening. The rather wide range of the shift speed depends mainly on the throttle opening which determines the shift point at a given vehicle speed. A 1–2 shift valve operates to perform shifting from the first speed to the second speed at generally low speed and a 2–3 shift valve operates from the second speed to the third speed at relatively high speed. The hydraulic urging source of the shift valve is governor pressure which is modulated and reduced pressure from main line pressure of the hydraulic control system so that the governor pressure will never exceed the line pressure. As the governor pressure generally increases as a quadratic curve, the inclination of low speed range is rather gradual compared to higher speed range, consequently, a governor pressure curve which provides sufficient pressure change to urge 1–2 shift valve at low speed range will soon saturate to line pressure and provides no pressure change to urge 2–3 shift valve at higher speed range. Then, it is preferable to impart tow characteristic curves to governor pressure having stepwise or steep pressure change at a predetermined vehicle speed and rather gradual quadrant curve above the speed so that sufficient pressure differences to urge the 1–2 shift valve is provided at the low speed range and to urge the 2–3 shift valve is provided at higher speed range which is rather steep inclination range of the quadrant curve corresponding to speed change.

On of known governors which has above-mentioned sufficient characteristics utilizes the line pressure as pilot pressure so that the valve must be manufactured as high pressure leak free resulting in high manufacturing cost.

It is a primary object of the invention to provide a governor valve assembly to supply sufficient pressure differences both to lower speed range shift valve and to higher speed range shift valve.

Another object of the present invention is to provide aforesaid governor valve assembly having simple construction, reduced leakage of hydraulic fluid in operation and improved characteristics.

The governor valve assembly having a line pressure passage, a governor pressure passage and a pilot pressure passage comprises, according to the invention, a first governor valve disposed between the governor pressure passage and the pilot pressure passage to communicate hydraulic pressure to the pilot pressure passage under a predetermined rotational speed and to cut off the communication between the both passages over the predetermined rotational speed, and a second governor valve disposed between the line pressure passage and the governor pressure passage to regulate the line pressure and to communicate the governor pressure as a function of rotational speed of the valve, the second governor valve providing a valve spool which is urged radially inwardly by the pilot pressure through the pilot pressure passage.

Figure 2:
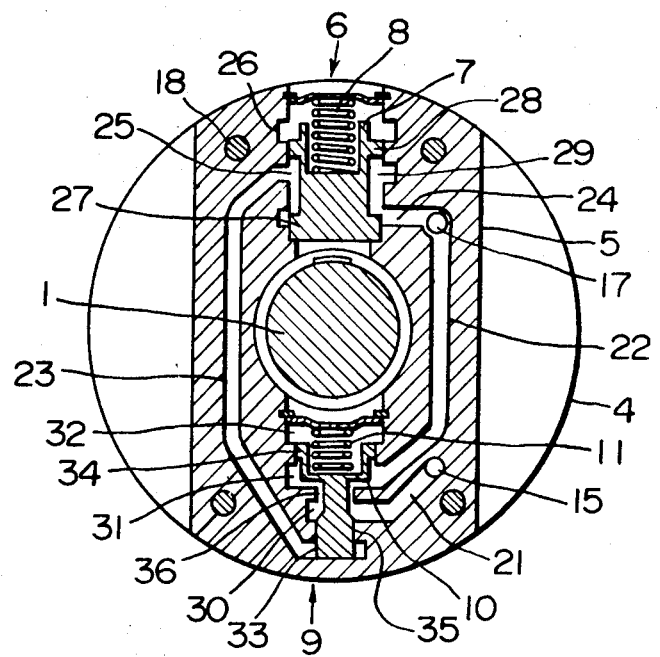
Figure 3:
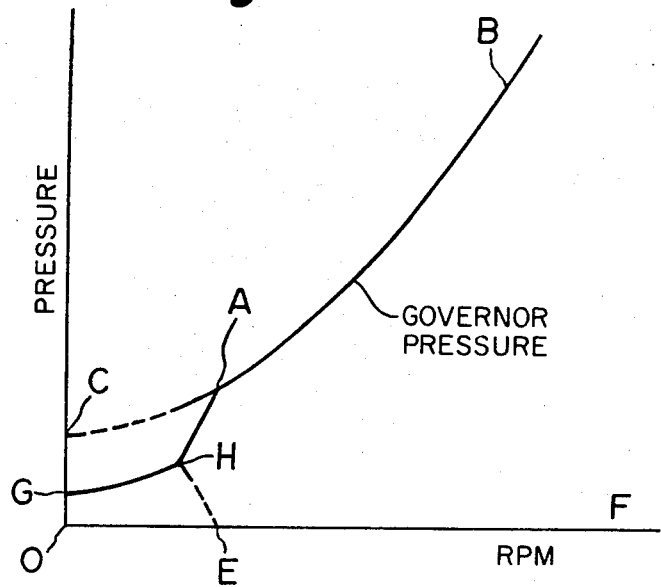
Figure 4:
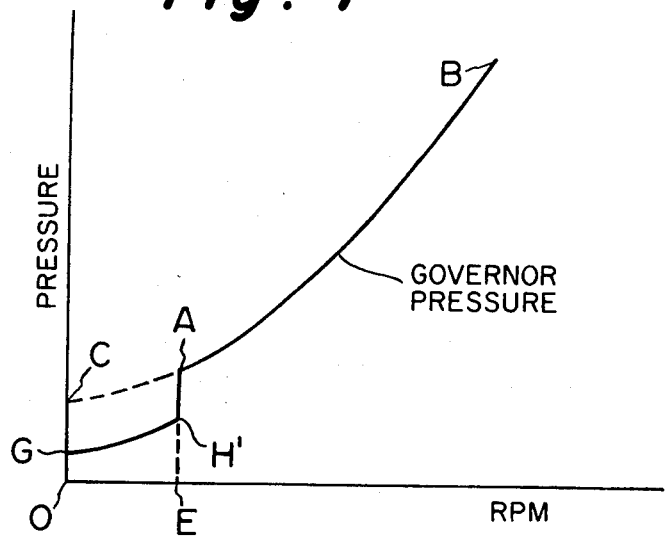

FIG. 1 shows longitudinal partial sectional view of one embodiment of a governor valve assembly according to the invention, FIG. 2 shows a sectional view along line II—II of FIG. 1, and FIG. 3 and FIG. 4 are two charts showing the speed pressure characteristic curves of two embodiments of the governor of FIG. 1.

Referring first to FIG. 1, reference numeral 1 designates a power input shaft which is driven by an output shaft not shown and is carried by automatic transmission assembly 2. Secured by a key 3 to the shaft 1, an oil distributor 4 is received in an end portion of the automatic transmission assembly and carries a valve body 5. A first governor valve 6 having a spool 7 and a spring 8 urging the spool 7 radially inwardly is radially slidably disposed in the valve body 5, and the sliding axis of the spool 7 is perpendicular to the axis of the shaft 1. A second governor valve 9 having a spool 10 and a spring 11 urging the spool radially outwardly is slidably disposed in the valve body 5 at the radially opposite direction of the first governor valve 5, and the axis of the spool 10 coincides to the axis of the spool 7. The other ends of the springs 8 and 11 are supported respectively by retainers 12 and 13 which are secured to the valve body 5.

A conduit 14 communicating with a passage 15 leads line pressure fluid which is regulated in a hydraulic control system not shown to the governor assembly and a conduit 16 communicating with a passage 17 supplies modulated governor pressure fluid to the hydraulic control system to be utilized as a control fluid representing the vehicle speed at that time.

As shown in FIG. 2 the valve body 5 is secured by means of bolts 18 to the oil distributor 4.

A passage 21 is provided to lead the line pressure through the passage 15 to the second governor valve 9, a passage 22 leads the modulated governor pressure to the passage 17 and to the first governor valve 6, and a passage 23 leads pilot pressure from the first governor valve 6 to the head portion of the second governor valve 9.

The first governor valve 6 provides a governor pressure port 24 communicating with the passage 22, a pilot pressure port 25 communicating with the passage 23 and an exhaust port 26 communicating through a passage not shown with a common fluid reservoir not shown. The spool 7 provides two lands 27 and 28 defining between the lands a groove 29 which acts as a communicating passage of fluid flowing from the port 24 to the port 25. Diameters of the lands 27 and 28 are determined according to desired characteristics of the governor as will be explained hereinafter.

The second governor valve 9 provides a line pressure port 30 communication with the passage 21, a governor pressure port 31 communicating with the passage 22, and an exhaust port 32 communicating with the reservoir not shown and a fluid chamber 33 communicating with the pilot pressure passage 23. The spool 10 provides two lands 34 and 35 defining between the land a groove 36 which acts as a passage between the line pressure passage 21 and the governor pressure passage 22. The land 34 has larger diameter than that of the land 35, and head portion of the land 35 protrudes in the fluid chamber 33 and is urged by the pilot pressure.

Operation of the above explained governor valve assembly according to the invention is as follows: In the first governor valve 6, as pressurized fluid flows into the groove 29 through the passage 22 and the governor pressure port 24, a hydraulic pressure acts on the spool 7 corresponding to the area difference $S_1$, between the lands 27 and 28 to urge the spool 7 radially outwardly or inwardly; the force is assumed to be radially outwardly having plus or minus value corresponding to the difference between the areas of the lands 27 and 28. When then sum of this force and the centrifugal force acting on the spool 7 exceed the initial urging force of the spring 8, the spool 7 moves outwardly so that the land 27 nearly closes the port 24 to limit flow rate of the fluid, the fluid flows between the land 28 and the adjacent wall surface to the exhaust port 26; thus, the fluid pressure in the groove 29 reduces from the governor pressure in the passage 22. When the sum of the hydraulic force in the groove 29 and the centrifugal force reduces, the spring 8 urges the spool 7 radially inwardly and opens the port 24 to increase flow rate of the fluid through the passage 22 and closes the port 26 to decrease the leakage to the exhaust port 26. Thus, pilot pressure $Pp$ in the groove 29 maintains equilibrium under the next equation:

$$Pp \times S_1 + Fc = Fs$$

in which:
$Pp$ is pilot pressure in the groove 29
$S_1$ is area difference between the lands 27 and 28
$Fc$ is centrifugal force applied to the spool 7
$Fs$ is urging force of the spring 8

The characteristic curve of governor pressure is represented in solid line in FIGS. 3 and 4. FIG. 3 shows governor pressure when diameter of the land 27 is larger than that of the land 28 of the first governor valve 8. FIG. 4 shows governor pressure when diameters of the land 27 and 28 are equal. In both cases as the spring 8 retains the spool 7 at low centrifugal force, governor pressure is supplied to passage 23 directly, so that pilot pressure is GH or GH'. In FIG. 3, at point H governor pressure urges the valve spool 7 to partially open exhaust port 26 by the land 28, thus pressure modulating effect is produced and hydraulic pressure through passage 23 is lower than governor pressure. As rotation speed increases exhaust port 26 tends to open by the land 28, so that modulated pressure is decreased until the land 27 completely covers the governor pressure passage 22, and passage 23 is connected only to exhaust port 26. Thus, hydraulic pressure through passage 23 is represented HE as shown by dotted line in FIG. 3. As hydraulic pressure acting on the spool 10 of the second governor valve 9 decreases rapidly, the governor pressure increases along line HA in FIG. 3. The inclination of line HA is more steep than first portion of line AB where passage 23 is connected with exhaust pressure.

In the second governor valve 9, the same pressure regulating function is performed. The spring 11 urges the spool 10 radially outwardly and hydraulic pressure in the groove 36, i.e., the governor pressure acting on the area difference between the land 34 and 35 urges the spool 10 radially inwardly since the diameter of the land 34 is larger than that of the land 35. When the pilot pressure is zero, the aforementioned equilibrium condition in this case is as follows:

$$P_G \times S_2 = Fs + Fc$$

in which:
$P_G$ is governor pressure in the groove 36,
$S_2$ is area difference between lands 34 and 35,
$Fs$ is urging force of the spring 11,
$Fc$ is centrifugal force acting to the spool 10.

The characteristics curve of the governor pressure $P_G$ is represented as curve CAB in FIG. 3.

When the pilot pressure through the passage 23 is applied to the head of the spool 10, a radially inwardly urging force is applied to the spool 10. Thus the equation is modified as follows:

$$P_G \times S_2 + Pp \times S_3 = Fs + Fc$$

or $$P_G \times S_2 = (Fs + Fc) - Pp \times S_3$$

in which:
$P_G$ is governor pressure,
$S_2$ is area difference of lands of the spool 10,
$Fs$ is urging force of the spring 11,
$Fc$ is centrifugal force of the spool 10,
$Pp$ is pilot pressure applied to the spool 10,
$S_3$ is head area of the spool 10.

Thus, as shown by full line in FIG. 3, governor pressure drops at low speed range CA or OE, and the output governor pressure is represented as line GHAB corresponding to pilot pressure GHE respectively.

Another governor pressure characteristic curve is shown in FIG. 4. The governor pressure shown in FIG. 4 is obtained as a special case of the first governor valve 6, in which the diameters of the lands 27 and 28 of the spool 7 are equal. In this case, the first governor valve has no pressure regulating function, so that the pilot pressure applied to the head of the spool 10 through the passage 23 is governor pressure itself. As the area difference between the lands 27 and 28 is zero, it is evident that no hydraulic pressure contributes to the shifting of the spool 7, so that when the centrifugal force $Fs$ is increased the spool 7 shifts radially outwardly against urging force of the spring 8 at a predetermined speed to cut off the pilot pressure passage passage 23 from the governor pressure passage 22 and to connect the exhaust port 26 to the passage 23. Thus the pilot pressure through the passage 23 reduces to zero at speed E in FIG. 4, so that the pilot pressure through the passage 23 is represented as line GH'E in FIG. 4. Thus by properly selecting the diameter of the land 35 of the spool 10, the governor pressure is represented as line GH'AB in FIG. 4 and is applied to the hydraulic shift control system of the automatic transmission through the passage 22, the passage 17 and the conduit 16.

Thus, as shown in FIG. 3 and FIG. 4, the governor valve assembly according to the invention provides steep or stepwise pressure change at low speed range and rather steep change at higher speed range, thus produces sufficient pressure differences to shift 1–2 shift valve and 2–3 shift valve respectively at desired speed range.

It will be appreciated that the governor valve assembly according to the invention has many advantages including as follows:

1. Spool valves 6 and 9 are disposed transversely to the axis of the shaft 1, so that maximum diameter of the rotating parts is reduced, and no counter weight is necessary to balance the forces.

2. The first and second governor valves 6 and 9 are coaxial, and the insided diameters of the valves can be sequentially reduced from outside of the first governor valve 6, i.e., downwardly in FIG. 2, so that the valve body 5 can be integral, and can be machined easily.

3. The pilot pressure is regulated from the governor pressure through the passage 22, so that hydraulic pressure in the valve body 5 is positively reduced and oil leakage problems are greatly reduced compared to known governor valves utilizing line hydraulic pressure as the pilot pressure.

I claim:

1. In a hydraulic governor valve assembly adapted to establish a pressure signal as a function of rotational speed of the valve, and including a valve body, first and second valve chambers formed in said valve body, first and second valve elements disposed respectively in said first and second valve chambers and adapted for radial shifting movement with respect to the axis of rotation of the valve body, a line pressure passage connecting a fluid pressure source with the governor valve assembly to supply line pressure, a governor pressure passage in fluid communication with the governor valve assembly to deliver said pressure signal as governor pressure, an exhaust port, a first biasing means adapted to radially inwardly bias said first valve element, and a second biasing means adapted to radially outwardly bias said second valve element; the improvement wherein said second valve chamber is in fluid communication with said line pressure passage and governor pressure passage, said second valve element being adapted to modulate line pressure to produce governor pressure, a first passage means further communicating governor pressure with said second valve chamber to modulate governor pressure, said first valve element being inserted in said first passage means to block said first passage means from governor pressure when the rotational speed of the valve is increased, whereby governor pressure is increased substantially stepwise at a substantially predetermined rotational speed of the valve while suppressing the leakage from the governor pressure passage.

2. A governor valve assembly according to claim 1, in which said first governor valve provides a valve spool having two lands to communicate the governor pressure between the lands, so that the governor pressure is modulated to the pilot pressure by the area difference between the lands.

3. A governor valve assembly according to claim 1, in which said first governor valve provides a valve spool having two lands of equal diameter to communicate the governor pressure between the lands, so that the governor pressure is not modulated and applied to said second governor valve as the pilot pressure.

4. In a hydraulic governor valve assembly adapted to establish a pressure signal as a function of rotational speed of the valve, and including a valve body, first and second valve chambers formed in said valve body, first and second valve elements disposed respectively in said first and second valve chambers and adapted for radial shifting movement with respect to the axis of rotation of the valve body, a line pressure passage connecting a fluid pressure source with the governor valve assembly to supply line pressure, a governor pressure passage in fluid communication with the governor valve assembly to deliver said pressure signal as governor pressure, and exhaust port, a first biasing means adapted to radially inwardly bias said first valve element, and a second biasing means adapted to radially outwardly bias said second valve element; the improvement wherein said second valve chamber is in fluid communication with said line pressure passage and governor pressure passage, said second valve element being adapted to modulate line pressure to produce governor pressure, said governor pressure passage is in fluid communication with said first valve chamber, a pilot pressure passage is in fluid communication with said first and second valve chambers to effect urging of said second valve element against said second biasing means and centrifugal force and to reduce governor pressure when said pilot pressure passage is in fluid communication with a fluid pressure, at least said first valve element having two lands of equal diameter to communicate the governor pressure between the lands, so that the governor pressure is not modulated and applied to said second valve chamber as the pilot pressure, said first element being adapted to connect said governor pressure passage with said pilot pressure passage at relatively low rotational speed of the valve and being further adapted to cut off communication between said governor pressure passage and said pilot pressure passage and to connect said pilot pressure passage with the exhaust port when the rotational speed of the valve is increased, whereby governor pressure is increased substantially stepwise at a substantially predetermined rotational speed of the valve without permitting leakage to occur from the governor pressure circuit.

* * * * *

UNITED STATES PATENT OFFICE
CERTIFICATE OF CORRECTION

Patent No. 3,690,335            Dated September 12, 1972

Inventor(s) Hirohisa Ichimura

It is certified that error appears in the above-identified patent and that said Letters Patent are hereby corrected as shown below:

On the cover sheet insert:

[30]  Foreign Application Priority Data

December 19, 1967   Japan.....80,980/67 --.

Signed and sealed this 20th day of August 1974.

(SEAL)
Attest:

McCOY M. GIBSON, JR.                    C. MARSHALL DANN
Attesting Officer                       Commissioner of Patents